United States Patent [19]
Figge, Sr.

[11] Patent Number: 5,314,228
[45] Date of Patent: May 24, 1994

[54] VEHICLE SIDE IMPACT INTRUSION BARRIER

[75] Inventor: Irving E. Figge, Sr., Manassas, Va.

[73] Assignee: Atlantic Research Corporation, Vienna, Va.

[21] Appl. No.: 31,974

[22] Filed: Mar. 16, 1993

[51] Int. Cl.$^5$ .............................................. B60J 5/00
[52] U.S. Cl. .................. 296/146.6; 296/189; 49/501
[58] Field of Search ................ 296/146 C, 188, 189; 49/501, 502

[56] References Cited

U.S. PATENT DOCUMENTS

| | | | |
|---|---|---|---|
| 3,618,693 | 11/1971 | Graham | 180/93 |
| 4,090,734 | 5/1987 | Inami et al. | 296/146 C |
| 4,272,103 | 6/1981 | Schmid et al. | 280/751 |
| 4,438,969 | 3/1984 | Kamijo et al. | 296/146 C |
| 4,488,751 | 12/1984 | Kling | 296/146 C |
| 4,545,172 | 10/1985 | Wardill | 296/189 |
| 4,742,899 | 5/1988 | Thornton | 296/188 |
| 4,901,500 | 2/1990 | Wycech | 296/188 |
| 4,915,442 | 4/1990 | Garnweidner | 296/188 |
| 4,917,433 | 4/1990 | Tomforde | 296/146 C |
| 4,919,473 | 4/1990 | Laimighofer et al. | 296/188 |
| 4,934,751 | 6/1990 | Shimoda | 296/188 |
| 4,958,884 | 9/1990 | Gold | 296/188 |
| 5,039,160 | 8/1991 | Garnweinder | 296/189 |
| 5,056,861 | 10/1991 | Garnweinder | 296/188 |
| 5,094,034 | 3/1992 | Freeman | 49/501 |

Primary Examiner—Robert R. Song
Attorney, Agent, or Firm—Frank P. Presta

[57] ABSTRACT

Impact intrusion barrier device for a vehicle door of the type which includes spaced inner, outer and side door panels defining a door cavity therebetween, and which is movably connected between forward and rear door pillar members. The device includes a beam member positioned in the door cavity and adapted to extend between the pillar members. The beam member is curved outwardly along a longitudinal axis thereof and has a pair of beam end portions which are operable to move longitudinally away from one another on adjacent outwardly facing surfaces of the side door panels or the pillar members when an inward force is applied to the beam member until the end portions contact abutment surfaces on the side door panels or the pillar members, thereby absorbing energy therefrom and initially directing the force laterally away from the interior of the vehicle and into the pillar members either directly or through the side door panels. The beam member preferably includes an outer panel member and an inner panel member which are both curved outwardly along a longitudinal axis thereof. The inner panel member is positioned substantially directly behind and spaced from the outer panel member, and the inner and outer panel members have end portions which are secured together to define the beam end portions.

20 Claims, 2 Drawing Sheets

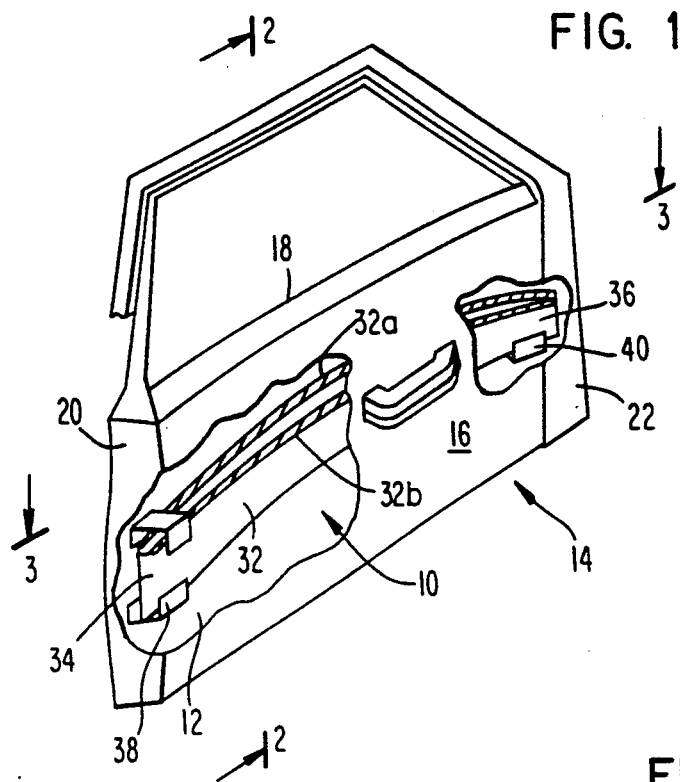
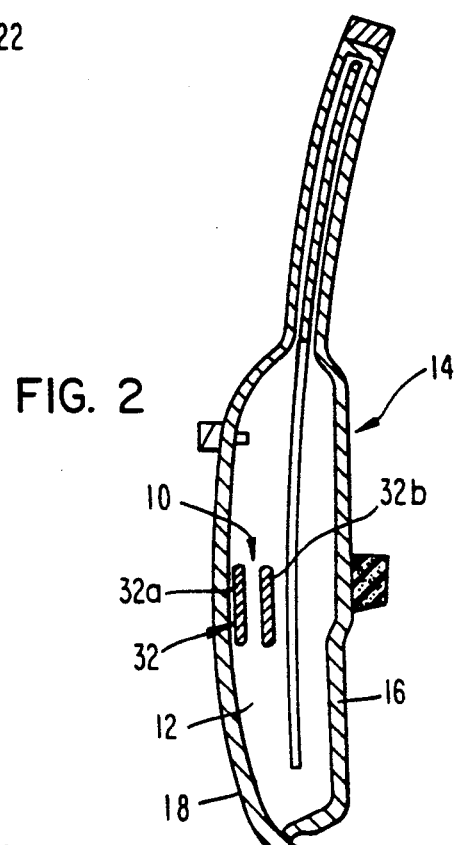
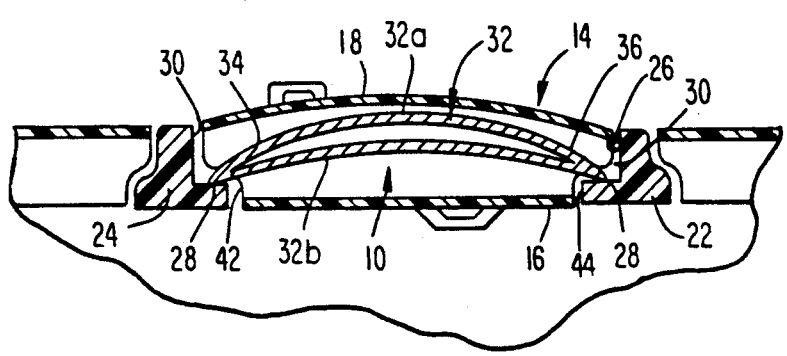

VEHICLE SIDE IMPACT INTRUSION BARRIER

BACKGROUND OF THE INVENTION

The present invention relates to an impact intrusion barrier device and, more particularly, to a barrier device which is particularly adapted for use in a vehicle door or the like for protecting vehicle occupants from side impacts with other vehicles.

There exist numerous safety devices for vehicle occupants which provide increased protection for the occupants when subjected to front or rear collisions, such as seat belts and air bags. However, there are a lack of effective safety devices which protect vehicle occupants from side impacts, particularly impacts to the front and/or rear doors of the vehicle.

Most motor vehicle doors include an outer door panel and an inner door panel in spaced relation such that a door cavity is defined therebetween. Disposed within the door cavity are various door systems such as locking mechanisms and window actuating means. Without further structural reinforcement, such hollow vehicle doors do not provide sufficient impact intrusion resistance to provide a desired level of safety protection for the vehicle occupants. Accordingly, when a vehicle of this type is subjected to a side impact from a collision or the like, the inner and outer door panels provide only limited resistance to door deformation and impact intrusion.

Such limited side impact resistance often results in serious injury to the vehicle occupants.

Therefore, a need exists for an economical and reliable impact intrusion barrier device which can be used in a vehicle door cavity or the like to provide increased protection from side impact intrusion. The impact intrusion barrier device of the present invention meets this need.

BRIEF DESCRIPTION OF THE RELATED ART

Various impact or intrusion resistant devices are known in the art as evidenced by the Wycech U.S. Pat. No. 4,901,500, Kling U.S. Pat. No. 4,488,751, Garnweidner U.S. Pat. No. 4,915,442, and Shimoda U.S. Pat. No. 4,934,751.

The patent to Wycech discloses a composite beam having a longitudinal cavity filled with polymeric material, and which is constructed to extend between and connect with a vehicle door frame for the purpose of increasing side impact resistance. The patent to Garnweidner discloses a door reinforcement which includes at least one tensile bracing band which is secured to the door struts for the purpose of more evenly distributing the impact force to the car body. The patent to Kling discloses an impact protection device which includes a tubular member supported in the door cavity such that impact forces are transmitted to the door threshold bearer.

While these and other known devices may provide some increased level of side impact protection for vehicle occupants, they suffer from a number of disadvantages owing to their expense, excessive weight, and complex manufacturing processes. Moreover, other known reinforcing means such as transverse hollow tubes, large heavy structural reinforcements and other beam constructions have also proven inadequate due to many of the same drawbacks and because they do not direct energy away from the direction of impact.

The new and improved impact intrusion barrier device of the present invention was developed to overcome the disadvantages of the known intrusion devices.

SUMMARY OF THE INVENTION

Accordingly, it is a primary object of the present invention to provide a lightweight and reliable impact intrusion barrier device which can be easily and inexpensively manufactured.

A more particular object of the present invention is to provide an intrusion barrier device which can easily and effectively be used in a vehicle door cavity to provide increased protection for the vehicle occupants during side impact collisions.

Another object of the invention is to provide an impact intrusion barrier which initially directs the force of the impact away from the vehicle occupants and into the vehicle door pillars.

Yet another object of the invention is to provide an impact intrusion barrier which is operable to absorb at least some of the energy from a side impact.

A further object of the invention is to provide an impact intrusion barrier which can be integrally formed of a fiber reinforced composite material.

These and other objects of the present invention are achieved by providing an impact intrusion barrier device for a vehicle door of the type which includes spaced inner, outer and side door panels defining a door cavity therebetween and which is hingedly connected between forward and rear door pillar members each having a substantially flat outwardly facing surface thereon, and an abutment surface thereon which extends outwardly from the outwardly facing surface. The device includes a beam member positioned in the door cavity and adapted to extend between the side door panels and the pillar members, wherein the beam member is curved outwardly along a longitudinal axis thereof and has a pair of beam end portions which are positioned outwardly of and adjacent to the outwardly facing surfaces, and adjacent to but spaced from the abutment surfaces on the pillar members, respectively. The end portions are operable to move longitudinally away from one another on the outwardly facing pillar member surfaces or the adjacent side door panel surfaces when an inward force is applied to the beam member until the end portions contact the abutment surfaces on the pillar members or the side door panels, respectively, thereby absorbing energy therefrom and initially directing the force laterally away from the interior of the vehicle and into the pillar members, either directly or through the side door panels.

The beam member preferably includes an outer panel member and an inner panel member which are both curved outwardly along a longitudinal axis thereof, the inner panel member being positioned substantially directly behind and spaced from the outer panel member, and further wherein the inner and outer panel members have end portions which are secured together to define the beam end portions.

Preferably, the beam end portions extend laterally outwardly of the door cavity through openings in the door side panels such that the beam end portions are positioned in contact with the pillar members. Alternatively, the beam end portions could contact the side door panels which are then moved into engagement with the pillar members upon deformation of the beam member.

DESCRIPTION OF THE DRAWINGS

Other objects and advantages of the subject invention will become apparent from a study of the following specification when viewed in light of the accompanying drawings, in which:

FIG. 1 is a perspective view of a vehicle side door with a portion of the inner door panel broken away to expose the impact intrusion barrier of the present invention;

FIG. 2 is a sectional view of the present invention taken along line 2—2 of FIG. 1.

FIG. 3 is a sectional view of the present invention taken along line 3—3 of FIG. 1.

DETAILED DESCRIPTION

Figure 4A:
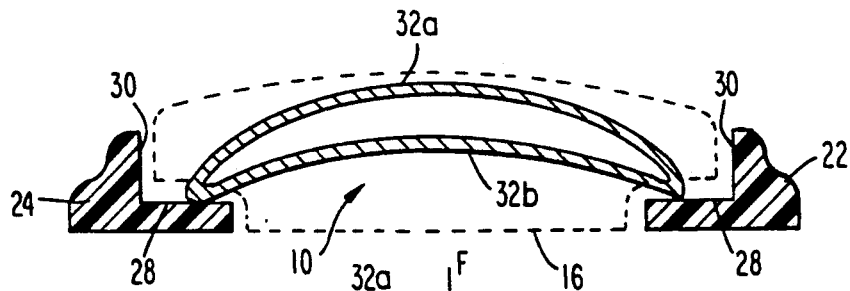
FIGS. 4a–4f are sectional time sequence views of the impact intrusion barrier of the present invention being subjected to an inward impact force and undergoing increasing stages of deformation.

Referring now to the drawings wherein like reference numerals designate similar parts throughout the various views, there is shown the impact intrusion barrier device 10 of the present invention positioned in door cavity 12 of a typical vehicle door 14. The vehicle door 14 includes spaced inner, outer and side door panels 16, 18 and 20, respectively, which define the door cavity 12. The door 14 is hingedly mounted between forward door pillar 22 and rear door pillar 24 via hinge 26. The impact intrusion barrier device 10 of the present invention is particularly adapted for use with the type of side door panels 20 or door pillars 22 and 24 which include a substantially flat outwardly facing surface 28 thereon and an abutment surface 30 thereon which extends outwardly from the outwardly facing surface 28.

The barrier device 10 includes a beam member 32 which is constructed to fit in the door cavity 12 and extend between the door pillars 22 and 24. The beam member 32 is curved outwardly along the longitudinal axis thereof and includes a pair of opposed beam end portions 34 and 36 which are positioned outwardly of and adjacent to the respective outwardly facing surfaces 28 on the door pillar 22 and 24, and adjacent to but spaced from the respective abutment surfaces 30 on the door pillars 22 and 24. Alternatively, the beam end portions could be positioned adjacent similar outwardly facing and abutment surfaces on the side door panels 20.

Preferably, the beam member 32 includes an outer panel member 32a and an inner panel member 32b which are both curved outwardly along a longitudinal axis thereof. The inner panel member 32b is positioned substantially directly behind and spaced from the outer panel member 32a and in generally parallel relation therewith. The inner and outer panel members 32a and 32b include end portions which are secured together to define the beam end portions 34 and 36. Preferably, the beam member 32 is integrally formed such that it is a unitary structure. The beam member preferably is formed of a filament wound or other fiber reinforced composite material, but any other suitable material, such as metal, may be used. The preferred materials are resin reinforced fiberglass, Kevlar ® or graphite fibers. The inner and outer panel members 32a and 32b may both have a solid construction, or in order to modify its deformation resistance, the outer panel member 32a may have a honeycomb-type or other non-solid construction.

In a preferred embodiment, the inner and outer panel members 32a and 32b are approximately six to eight inches in height, and the beam member 32 is positioned in the door cavity 12 at a height which is approximately equal to the typical height of a vehicle bumper. Beam support members 38 and 40 may be provided in the door cavity 12 for movably supporting the beam member 32 at the desired height and position therein. Preferably, the beam support members 38 and 40 are positioned adjacent to the beam end portions 34 and 36, and are operable to maintain the beam in the desired position, while also enabling the beam end portions 34 and 36 to move away from one another when an inward force is applied to the beam member 32. As shown in FIG. 1, the beam support members 38 and 40 may be in the form of brackets which are constructed to cradle the beam member 32 such that it may move laterally therein.

In accordance with the present invention, the beam end portions 34 and 36 may extend laterally out of the door cavity 12 through openings 42 and 44 in the door side panels 20, to a position in which they are in direct contact with the respective door pillars 22 and 24. Alternatively, the beam end portions could contact the side panels 20 instead of the door pillars.

Figure 4B:
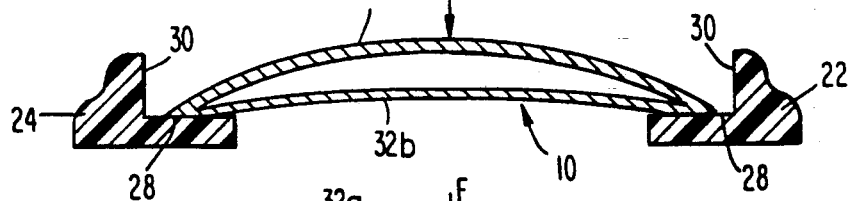
Figure 4C:
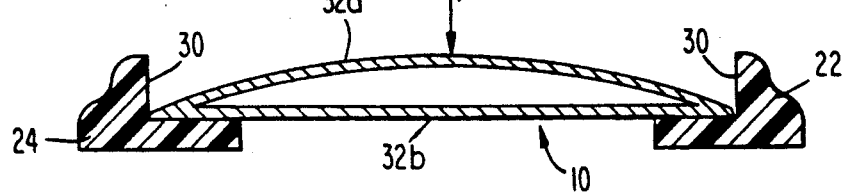

As shown in FIGS. 4a–4F, when the beam member 32 is subjected to an inward force (F) from a side impact collision, the beam end portions 34 and 36, in one embodiment, are operable to move laterally away from one another on the outwardly facing surfaces 28 of the respective pillar members 22 and 24. As shown in FIG. 4b, during the lateral movement of the beam end portions 34 and 36, the inner and outer panel members 32a and 32b begin to bend inwardly, which absorbs some of the energy from the impact force (F). After the beam end portions 34 and 36 move a predetermined distance, they contact the abutment surfaces 30 on the pillars which act to stop them from moving further apart. As shown in FIG. 4c, the radii of curvature of the panel members 32a and 32b are preferably such that, when the beam end portions contact the abutment surfaces, the outer panel member 32a still has a slight curvature, and the inner panel member 32b is under tension loading from the outer panel member 32a. At this stage, the bending loading of the outer panel member 32a and the tension loading of the inner panel member 32b act to absorb additional energy from the impact force (F). In addition, when the beam end portions 34 and 36 contact the abutment surfaces 30, the impact force (F) is initially transmitted laterally into the pillar members 22 and 24 and away from the interior of the vehicle.

Figure 5:
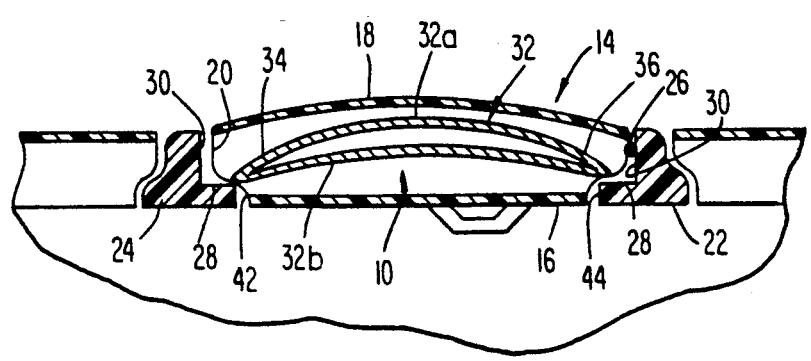
FIG. 5 is a sectional view of an alternative embodiment of the present invention.

In an alternate embodiment shown in FIG. 5, the beam end portions 34 and 36 could contact the adjacent side door panels 20 during outward movement thereof to deform the side door panels outwardly into engagement with the adjacent pillar members 22 and 24.

Figure 4D:
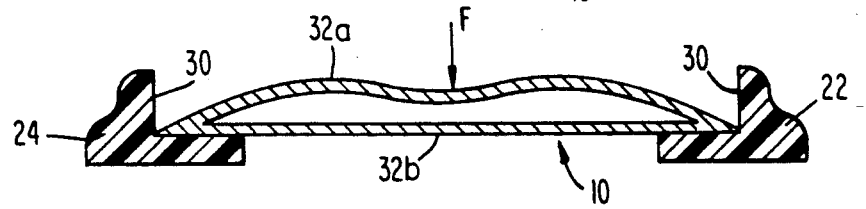
Figure 4E:
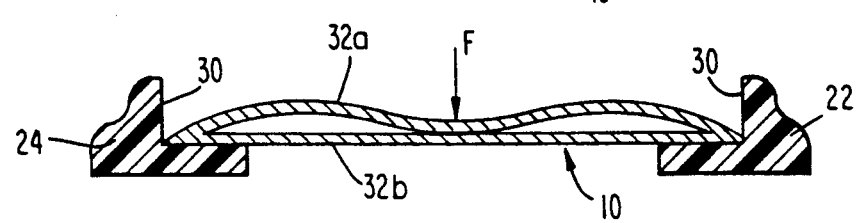
Figure 4F:
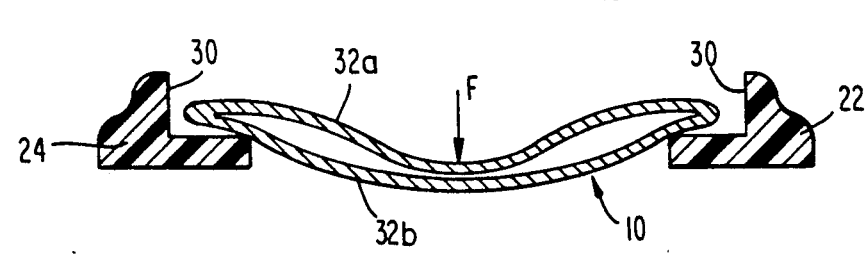

As shown in FIG. 4d, the outer panel member 32a will thereafter begin to compressively buckle, while the inner panel member 32b remains under tension loading. Thereafter, the outer panel member 32a will buckle and contact the inner panel member 32b, as shown in FIG. 4e. Finally, both the inner and outer panel members will bend inwardly under the impact force (F), as shown in FIG. 4f.

In accordance with the present invention, the beam member 32 is operable to absorb a significant amount of energy from an impact force due to the various levels of bending, compressing, tensioning, compressive buckling and buckling which the panel members 32a and 32b are subjected to. A significant amount of energy is also transmitted to the door pillars 22 and 24, either directly or through the side door panels 20. It can therefore be seen that the impact intrusion barrier device of the present invention provides increased safety for vehicle occupants when subjected to side impact collisions.

While in accordance with the patent statute, the preferred forms and embodiments of the invention have been illustrated and described, it will be apparent to those of ordinary skill in the art that various changes and modifications may be made without deviating from the inventive concepts set forth above.

I claim:

1. Impact intrusion barrier device for a vehicle door of the type which includes spaced inner, outer and side door panels defining a door cavity therebetween and which is movably mounted between forward and rear door pillar members each having a substantially flat outwardly facing surface thereon and an abutment surface thereon which extends outwardly from the outwardly facing surface, said barrier device comprising a beam member positioned in the door cavity and adapted to extend laterally between the pillar members, wherein said beam member is curved outwardly along a longitudinal axis thereof and has a pair of beam end portions which are positioned outwardly of and adjacent to the outwardly facing surfaces, and adjacent to but spaced from the abutment surfaces on the pillar members, respectively, and means for slidably supporting said end portions in the door cavity, whereby said end portions are operable to move longitudinally away from one another on the outwardly facing surfaces when an inward force is applied to said beam member until said end portions contact the abutment surfaces, respectively, thereby absorbing energy therefrom and initially directing the force laterally away from the interior of the vehicle and into the pillar members.

2. Device as defined in claim 1, wherein said beam member includes an outer panel member and an inner panel member which are both curved outwardly along a longitudinal axis thereof, said inner panel member being positioned substantially directly behind and spaced from said outer panel member, and further wherein said inner and outer panel members have end portions which are secured together to define said beam end portions.

3. Device as defined in claim 1, wherein said beam end portions are adapted to extend laterally out of said door cavity through a pair of openings in the vehicle door side panels, respectively, to said position adjacent the pillar members.

4. Device as defined in claim 1, wherein said beam member is positioned in the vehicle door at a height which is substantially equal to the height of a vehicle bumper.

5. Device as defined in claim 2, wherein said outer and inner panel members are approximately six to eight inches in height.

6. Device as defined in claim 2, wherein said outer and inner panel members are in generally parallel relation.

7. Device as defined in claim 2, wherein said panel members and said end portions are integrally formed such that said beam member is a unitary structure.

8. Device as defined in claim 7, wherein said beam is formed of a fiber reinforced composite material.

9. Device as defined in claim 7, wherein said beam is formed of metal.

10. Device as defined in claim 2, wherein said outer and inner panel members are of substantially solid construction.

11. Device as defined in claim 2, wherein said outer panel member is of honeycomb-type construction and said inner panel member is of substantially solid construction.

12. Device as defined in claim 2, wherein said outer panel member has a radius of curvature which enables it to retain a slight curvature when said beam end portions contact the abutment surfaces on the pillar members.

13. Device as defined in claim 2, wherein said inner panel member has a radius of curvature which enables it to be substantially straight when said beam end portions contact the abutment surfaces on the pillar members.

14. Device as defined in claim 12, wherein said inner panel member has a radius of curvature which enables it to be substantially straight and under tension when said beam end portions contact the abutment surfaces on the pillar members.

15. Device as defined in claim 13, wherein said inner panel member is so constructed that it is subjected to longitudinal tension when said beam end portions contact the abutment surfaces on the pillar members.

16. Device as defined in claim 1, wherein said supporting means includes a pair of bracket members positioned adjacent said beam end portions which support the beam member in a desired position in the door cavity, said bracket members being adapted to enable the beam end portions to move laterally therein when an inward force is applied to said beam member.

17. Impact intrusion barrier device for a vehicle door of the type which includes spaced inner, outer and side door panels defining a door cavity therebetween and which is movably mounted between forward and rear door pillar members, said barrier device comprising a beam member positioned in the door cavity and adapted to extend laterally between the side door panels and the pillar members, wherein said beam member is curved outwardly along a longitudinal axis thereof and has a pair of beam end portions which are positioned adjacent to said side door panels, respectively, and means for slidably supporting said end portions in the door cavity, whereby said end portions are operable to move longitudinally away from one another when an inward force is applied to said beam member until said end portions contact said side door panels, respectively, thereby absorbing energy therefrom and initially directing the force laterally away from the interior of the vehicle and into said side door panels and the adjacent pillar members.

18. Device as defined in claim 17, wherein said beam member includes an outer panel member and an inner panel member which are both curved outwardly along a longitudinally axis thereof, said inner panel member being positioned substantially directly behind and spaced from said outer panel member, and further wherein said inner and outer panel members have end portions which are secured together to define said beam end portions.

19. Impact intrusion barrier device for a vehicle door of the type which includes spaced door panels defining a door cavity therebetween and which is movably mounted between forward and rear door pillar members, said barrier device comprising a beam member positioned in the door cavity and adapted to extend laterally between the pillar members, wherein said beam member is curved outwardly along a longitudinal axis thereof and has a pair of beam end portions which are positioned adjacent to the pillar members, respectively, and means for slidably supporting said end portions in the door cavity, whereby said end portions are operable to move longitudinally away from one another when an inward force is applied to said beam member until said end portions contact the pillar members, thereby absorbing energy therefrom and initially directing the force laterally away from the interior of the vehicle and into the pillar members.

20. Device as defined in claim 19, wherein said beam member includes an outer panel member and an inner panel member which are both curved outwardly along a longitudinal axis thereof, said inner panel member being positioned substantially directly behind and spaced from said outer panel member, and further wherein said inner and outer panel members have end portions which are secured together to define said beam end portions.

* * * * *